(12) United States Patent
Bozek et al.

(10) Patent No.: US 7,873,847 B2
(45) Date of Patent: Jan. 18, 2011

(54) METHOD OF POWER STATE CONTROL FOR A SERVER BLADE IN A BLADE—SERVER CHASSIS SYSTEM

(75) Inventors: James J. Bozek, Bothell, WA (US); Makoto Ono, Cary, NC (US); Edward S. Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 11/616,501

(22) Filed: Dec. 27, 2006

(65) Prior Publication Data

US 2008/0162956 A1 Jul. 3, 2008

(51) Int. Cl.
*G06F 1/00* (2006.01)
*G06F 15/16* (2006.01)
(52) U.S. Cl. .................. 713/310; 713/300; 709/203; 709/219
(58) Field of Classification Search .............. 713/300, 713/310; 709/203, 219
See application file for complete search history.

(56) References Cited

U.S. PATENT DOCUMENTS 7,398,401 B2 * 7/2008 Goud et al. ............... 713/300

| | | | |
|---|---|---|---|
| 2006/0020698 A1 | 1/2006 | Whipple et al. | |
| 2006/0168457 A1 * | 7/2006 | Leech et al. | 713/300 |
| 2006/0203460 A1 | 9/2006 | Aviv | |
| 2007/0055793 A1 * | 3/2007 | Huang et al. | 710/8 |
| 2007/0130481 A1 * | 6/2007 | Takahashi et al. | 713/300 |
| 2008/0028242 A1 * | 1/2008 | Cepulis | 713/320 |

OTHER PUBLICATIONS

Bozek, James J. et al., U.S. Appl. No. 11/697,158, Non-Final Office Action dated Oct. 28, 2009.

* cited by examiner

*Primary Examiner*—Stefan Stoynov
(74) *Attorney, Agent, or Firm*—Dillon & Yudell LLP

(57) ABSTRACT

A method for controlling the different power states of a ClientBlade™ from a remote desktop environment is described. A remote user is permitted to control the different power states of the ClientBlade™ remotely via a remote client having an operating system or a thin client (or decompression brick) with no operating system. Administered authentication of the remote user is required before access is granted to the management module in the BladeCenter™ environment to enable the changes to the power state of the ClientBlade™.

17 Claims, 8 Drawing Sheets

METHOD OF POWER STATE CONTROL FOR A SERVER BLADE IN A BLADE—SERVER CHASSIS SYSTEM

BACKGROUND OF THE INVENTION

1. Technical Field

The present invention generally relates to computer systems and in particular to control of power states in computer systems. Still more particularly, the present invention relates to a method, system, and data processing system configuration that enable control of the power states in a BladeCenter™ environment.

2. Description of the Related Art

The need for more efficient processing systems has lead to the growth of multi-component computer systems. These computer systems often include components such as servers, hard drives, and peripheral devices stored in vertical racks, integrated into a freestanding chassis device. Also, as enterprises grow, requiring more computer power and less space consumption, the need for more streamlined computing resources is apparent. International Business Machines (IBM) Corp. of Armonk, N.Y., has developed the IBM BladeCenter™ and ClientBlades™, which bundles computing systems into a compact operational unit. The IBM eServer BladeCenter™ provides the streamlined computing resources desired by the various enterprises.

The BladeCenter™ is a consolidation of servers into a compact, more manageable environment. The BladeCenter™ chassis provides slots for desktop blades or ClientBlades™ that are composed of a processor, memory, hard disk storage, and firmware. Remote BladeCenters™ support client environments in which the client desktop operating system and all applications run on ClientBlades™. The BladeCenter™ centrally manages all client computers. ClientBlades™ host end-user sessions by providing computing power and storage, while the user performs input and output tasks via interaction with a thin client device.

One drawback to existing implementations of the ClientBlade™ environment is that the ClientBlade™ does not enable a remote user(s) to conveniently manage many of the power state activities of the ClientBlade™. Currently, changing a ClientBlade™ power state to the sleep state is completed by a program, which monitors the time of inactivity of the remote user's operating system. Once the pre-set amount of time of inactivity expires, signals requesting the sleep power state are transmitted to the ClientBlade™, where the power state changes to the sleep state. Remote users may also control power states of a ClientBlade™ from a remote computer if the remote computer utilizes an operating system, such as Windows XP™. The operating system of the remote computer communicates with the operating system of the ClientBlade™ to control the power states of the ClientBlade™. Methods exist that allow an end user to control the on and off power state of the ClientBlade™. However, there is currently no convenient way to access the various other power states (e.g., sleep state and hibernate state). Thus, while the on/off power state changes are supported, there are many disadvantages to the current process when considering the inaccessibility of an end user to controlling the other power states of the ClientBlade™.

Existing server blade and ClientBlade™ power state management operations are useful and provide secure server usage. However, in the remote desktop environment, there is a need for an end user or administrator to be able to remotely control each of the different power states of the ClientBlade™.

SUMMARY OF THE INVENTION

Disclosed is a method for enabling a remote user to control the different power states of a ClientBlade™ from a remote desktop environment. An end-user is authenticated and then permitted to control the different power states of the ClientBlade™ from a remote device. In one embodiment, the remote user's (device) desktop environment does not require an operating system to manage the power states of the ClientBlade™. The remote device comprises a decompression brick system, which provides keyboard, mouse, and USB input from the end user and contains hardware for decompressing video and audio transmitted from the ClientBlade™ to the end user. The decompression brick allows keyboard and mouse inputs by the end user, as well as other USB input devices, all from a remote location, while the actual data processing is performed by the ClientBlade™.

In one implementation, end users utilize a serial or network connection to access the power control features of the ClientBlade™ via the device's management module. Access to the management module enables the end-user to have full control of the power states of the ClientBlade™, independent of any operating system. Modified instruction to the basic input/output system (BIOS) transmitted from the management module via the baseboard management controller (BMC) of the ClientBlade™ enables the ClientBlade™ to enter additional power states. Therefore, in addition to control of the on/off power states of the ClientBlade™, an end user of a decompression brick may control the sleep and hibernate power states of a ClientBlade™.

In another embodiment of the invention, the end-user desktop environment may utilize an operating system, such as with a thin client system, to manage the power states of the ClientBlade™. A thin client is a network computer without a hard disk drive that only provides video, keyboard, and mouse interface to the ClientBlade™. Thin clients allow all data processing to be performed by the ClientBlade™ from a remote location by an end user. End users may access total power state control of the ClientBlade™ through the thin client operating system. The operating system transmits the power state change instruction to the super input/output (SIO), which notifies the BMC and power controller. The super input/output (SIO) controls the power state hardware and permits the ClientBlade™ power state change to occur.

In another embodiment, a serial over LAN (SOL) connection is utilized to control the sleep and hibernate power states of the ClientBlade™. The SOL connection of the ClientBlade™ transmits data over a local area network (LAN), and may be utilized for remote ClientBlade™ power state control. SOL avoids the use of access cables from serial-connections and allows a remote user to manage the power states of the ClientBlade™ from any remote location with network access through the ClientBlade™ Ethernet interface. Power state signals sent through the Ethernet are transmitted to the baseboard management controller (BMC) of the ClientBlade™, which provides pulsed instruction to the power state hardware regulating the various power states of the ClientBlade™. In addition to the ability of the end user to regulate the on/off power state of the ClientBlade™, the end user may also control the sleep and hibernate power states through the SOL connection.

According to one embodiment, a password authentication is required to permit total or partial control of the ClientBlade power states by an end user. The password is end user dependent and may be implemented in the form of a privilege bit mask, which is utilized to verify access to the power states by the end-user. The privilege bit mask is an instruction in which each bit represents an action that may be set for each entry in an access control list, such as user name, password, and security level. The end user connects to the ClientBlade™ through a serial or network connection and establishes communication with the management module of the Client-Blade™. When requesting a power state change, the end user inputs the power state command followed by the user assigned password. The management module transmits a three bit signal to the BMC instructing the ClientBlade™ to hard power off, shutdown, sleep, hibernate, or power on as permitted by the administered privilege level.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
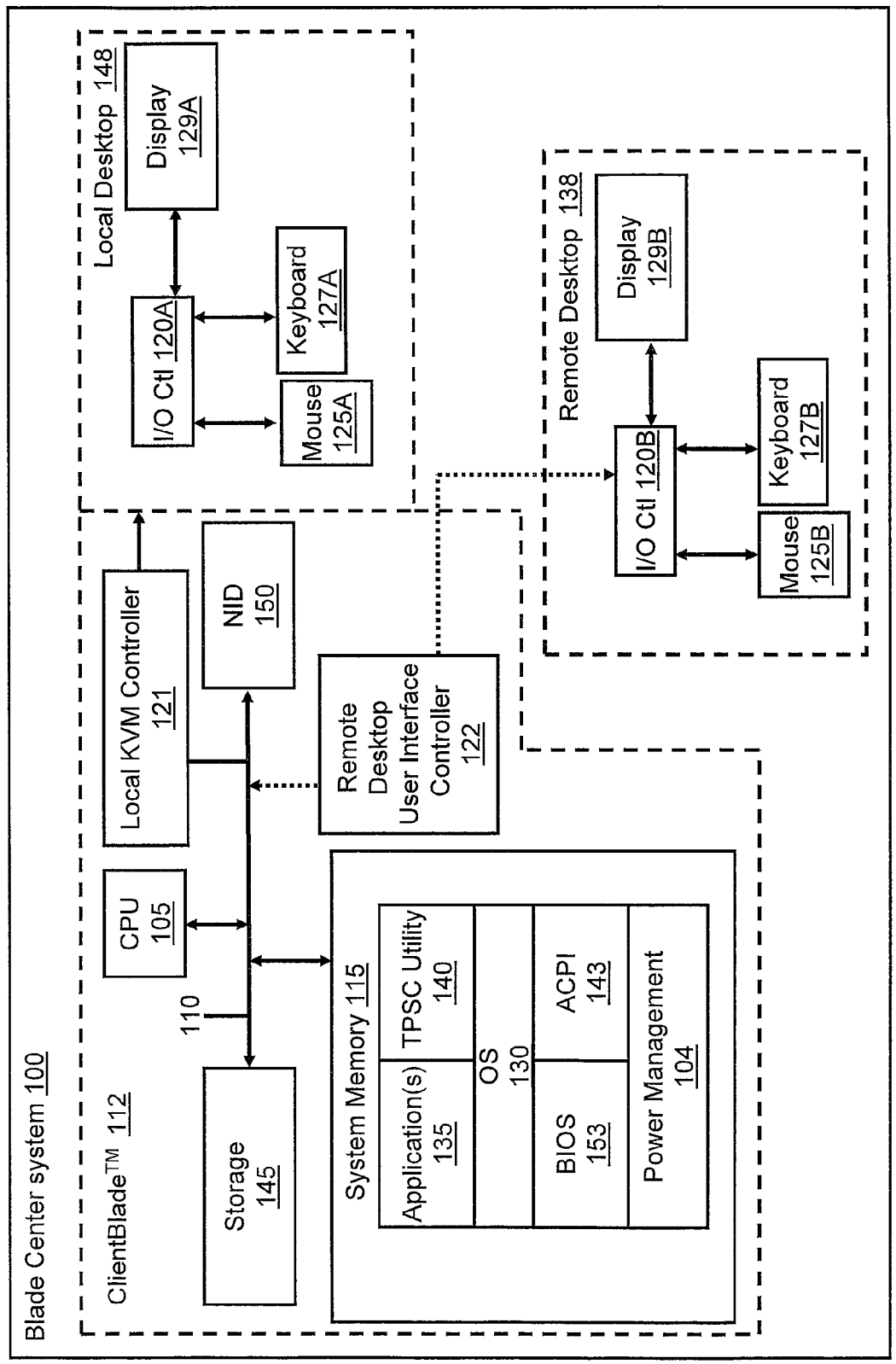
FIG. 1 is a diagram of an example data processing system utilized to implement an illustrative embodiment of the present invention.

The present invention provides a method, system and computer program product for controlling the different power states of a ClientBlade™ from a remote desktop environment. The ClientBlade™ management module is modified by assigning privileged masks to allow a remote end-user to have total power state control without utilizing an operating system. Access to the ClientBlade™ is completed via a serial over LAN connection, or through a remote decompression brick. Several methods for controlling the various Client-Blade™ power states are provided and described herein.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 2xx for FIG. 2 and 3xx for FIG. 3). The specific numerals assigned to the elements are provided solely to aid in the description and not meant to imply any limitations (structural or functional) on the invention.

It is also understood that the use of specific parameter names are for example only and not meant to imply any limitations on the invention. Embodiments of the invention may thus be implemented with different nomenclature/terminology utilized to describe the above parameters, without limitation.

Within the description of embodiments of the invention, a ClientBlade™ is a subset of an industry-standard server blade that is implemented as a thin, pluggable desktop processor board. The ClientBlade™ slides into a BladeCenter™ chassis, or enclosure, designed specifically to house multiple ClientBlade™ units. Each ClientBlade™ connects to the mid-plane of the BladeCenter™ chassis, from which the ClientBlade™ shares common resources such as power, cooling, network connectivity, management functions, and access to other shared resources (such as a front-panel, CD-ROM drive, or diskette drive).

With reference now to the figures, FIG. 1 depicts a basic structure of a blade computer system utilized in one embodiment of the invention. In FIG. 1, there is depicted a block diagram representation of a blade computer system within which features of the invention may be advantageously implemented. ClientBlade™ 112 of BladeCenter™ system 100 comprises a central processing unit (CPU) 105 coupled to system memory 115 via a system bus/interconnect 110. Also coupled to system bus 110 is local keyboard/mouse/video transmission controller 121 connected to an input/output (I/O) controller 120A, which controls access to local desktop 148. A Remote Desktop User Interface controller 122 is also connected to remote I/O controller 120B, which controls access to remote desktop 138. The Remote Desktop User Interface controller 122 is independent of the CPU 105.

FIG. 1 also illustrates several input devices that allow access to local desktop 148 and remote desktop 138 of which are mouse 125A and 128B, as well as keyboard 127A and 127B, respectively. I/O controller 120A and 120B also control access to output devices, of which are illustrated as display 129A and 129B, respectively. According to the described embodiments of the invention, an end user is provided the same functional capability remotely by using the connectivity found in the Remote Desktop User Interface controller 122. In another embodiment, the end user is provided the functional capability locally by using the local keyboard/mouse/video transmission controller 121.

In order to support use of removable storage media, I/O Controllers 120A and 120B may further support one or more USB ports (not specifically shown) and/or media disk drive, such as compact disk Read/Write (CDRW)/digital video disk (DVD) drive, for example. ClientBlade™ 112 further comprises network interface device (NID) 150 by which Client-Blade™ 112 is able to connect to and communicate with an external device or network (such as the Internet). NID 150 may be a modem or network adapter and may also be a wireless transceiver device.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as software instruction stored within system memory 115 or other storage and executed by processor(s) 105. Among the software instruction are instructions for enabling network connection and communication via NID 150, and more specific to the invention, instruction for enabling the total power state control features described below. As previously stated, an end user has the same functional capability remotely by using the connectivity found in the Remote Desktop User Interface controller 122 and locally by using the local keyboard/mouse/video transmission controller 121. For simplicity, the collective body of instruction that enables the total power state control (TPSC) control features is referred to herein as TPSC utility 140. In actual implementation, TPSC utility 140 may be added to existing operating system (OS) instructions in the presence of an operating system, or as a stand alone application to provide the total power state control functionality described below.

Thus, as shown by FIG. 1, in addition to the above-described hardware components, ClientBlade™ 112 further comprises a number of software (and/or firmware) components, including basic input/output system (BIOS) 153, advanced configuration and power interface (ACPI) 143, operating system (OS) 130 (e.g., Microsoft Windows®, a trademark of Microsoft Corp, or GNU®/Linux®, registered trademarks of the Free Software Foundation and The Linux Mark Institute) and one or more software applications, including TPSC utility 140. BIOS 153 contains instructions required for ClientBlade™ 112 to control the remote and local desktop peripheral devices and power management 104. ACPI 143 establishes industry-standard interfaces and specifies how BIOS 153, OS 130, TPSC 140, and all other peripheral devices communicate with each other regarding power usage.

In implementation, OS 130 and TPSC utility 140 are located within system memory 115 and executed on processor (CPU) 105. According to the illustrative embodiment, when processor 105 executes TPSC utility 140, TPSC utility 140 enables ClientBlade™ 112 to complete a series of functional processes, including: (A) Total power state control by the remote user; (B) Remote power state control via a decompression brick system; and (C) Privileged access total power state control; and other features/functionality described below and illustrated by FIGS. 2-7.

A. Total Power State Control by the Remote User

Figure 3:
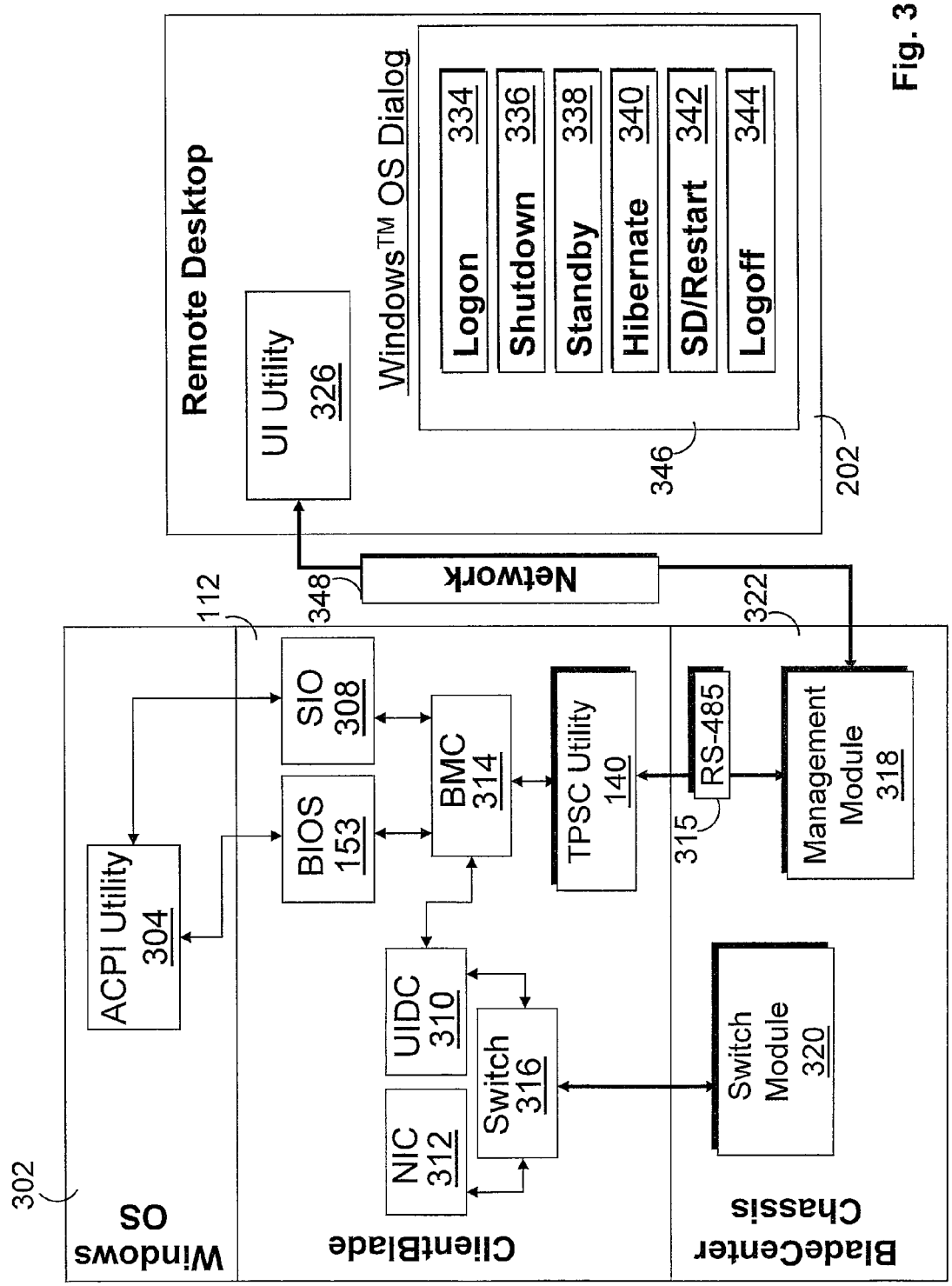
FIG. 3 is a block diagram illustrating power state control from a remote user in accordance with one embodiment of the present invention.

FIG. 3 is a block diagram of the BladeCenter™ System configuration when implementing total power state control by a remote user through a network connection. BladeCenter™ chassis 322 comprises management module 318 and switch module 320. The main task of management module 320 is to manage BladeCenter™ chassis 322, as well as blades (e.g. ClientBlade™ 112), modules, and shared resources. BladeCenter™ chassis 322 also provides functionality that allows a data center management application, such as TPSC utility 140, to be used to manage the BladeCenter system. Management module 320 consists of a processor and switch functions. Management module 320 has an Ethernet point-to-point connection via switch module 320. Switch module 320 provides networking and/or switch functions to ClientBlade™ 112. ClientBlade™ 112 is composed of Super I/O (SIO) 308, User Interface Daughter Card (UIDC) 310, network interface card (NIC) 312, baseboard management controller (BMC) 314, and switch 316. Super I/O 308 and UIDC 310 communicate with BMC 314 during power state change. NIC 312 allows ClientBlade™ 306 to connect to and communicate with an external device or network (e.g. network 348). BMC 314 works in conjunction with management module 320 to manage ClientBlade™ 112. BMC 314 is responsible for power management of ClientBlade™ 112. RS-485 bus 315 provides the communication path between the management module and TPSC utility 140 in ClientBlade™ 112. Switch 316 receives information from switch module 320 and initiates switch functions of ClientBlade™ 112.

Management module 318 receives power state instructions from user interface (UI) utility 326 of remote desktop 202. Remote desktop 202 includes all basic functions of a thin client system including Windows™ Operating System 346, which allows the remote user to control all power states of ClientBlade™ 112. These power states include: logon, shutdown, standby, hibernate, shutdown (SD)/restart, and logoff, all represented by respective functions 334, 336, 338, 340, 342, and 344.

Figure 2:
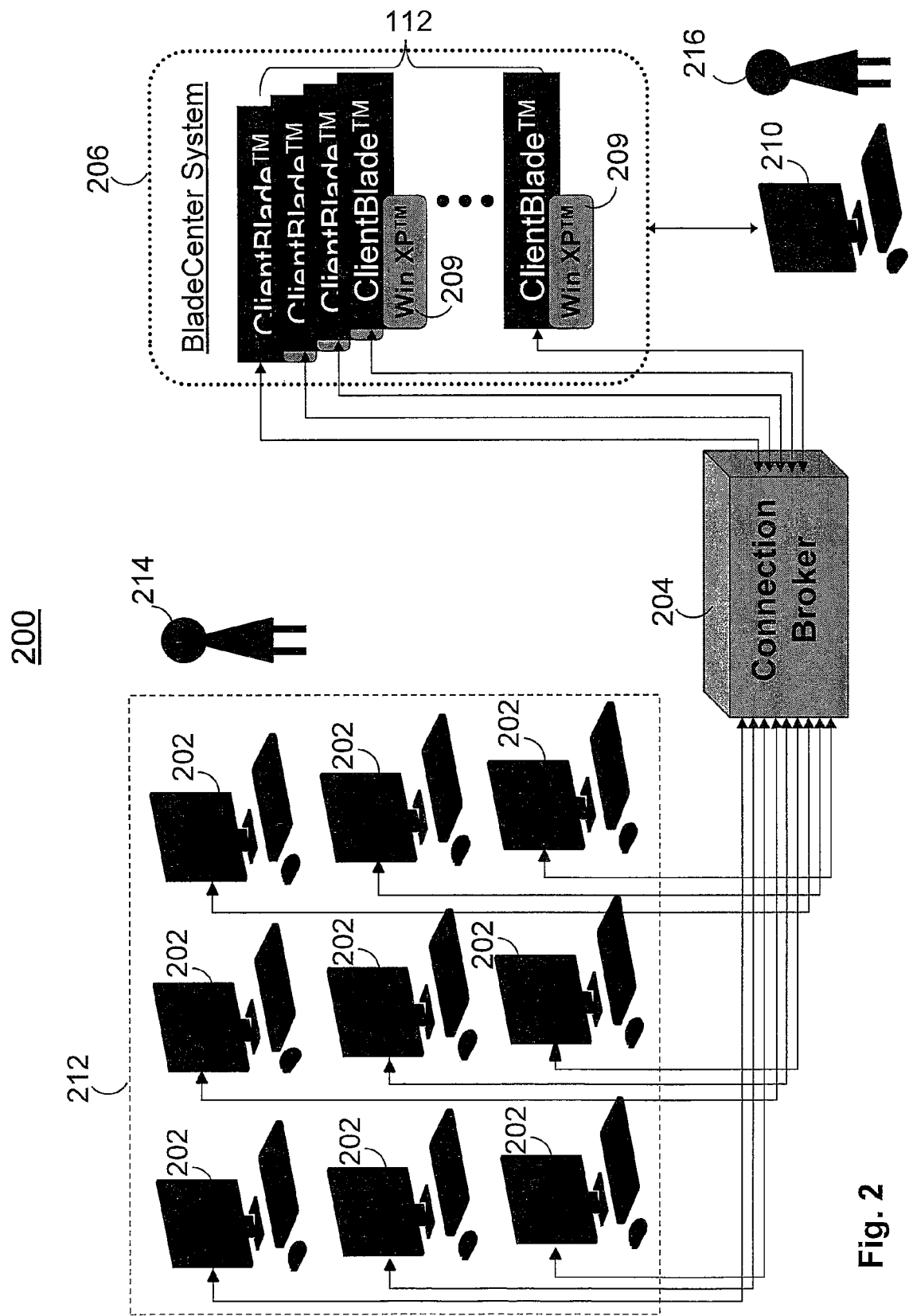
FIG. 2 is a diagram of thin client computers linked to a BladeCenter™ system over a local or remote area network in accordance with an illustrative embodiment of the present invention.

In one embodiment, to accomplish a power state change from remote desktop 202, UI utility 326 sends a series of Transmission Control Protocol/Internet Protocol (TCP/IP) messages, via network 348, to management module 318 initiating power state change. If required, connections may be passed through a connection broker, as shown in FIG. 2, for purposes of user authentication. UIDC 310 receives TCP/IP messages and then sends an interrupt to BMC 314. BMC 314 receives the request for a power state change and performs the action on ClientBlade 112. BladeCenter Chassis 322 is notified of the power state change by management module 318.

In another embodiment, management module 318 receives a remote request to change the power via a serial over LAN connection. Management module 318 sends a power state change command to TPSC utility 140 via RS-485 bus 315, TPSC utility 140 transmits the request for power state change to BMC 314. BMC 314 provides a power on/off pulse of varying lengths to the power management. Pulse lengths are dependent on the requested power state. The pulses are interpreted by the basic input/output system (BIOS) 153 of ClientBlade™ 112. In an example embodiment a pulse of less than one second to the BIOS puts ClientBlade™ 112 in the sleep state. A pulse of greater than one second, but less than four seconds forces ClientBlade™ 112 into hibernate state. If a hard power off is required, there is no communication with the BIOS. To initiate a hard power off, management module 318 sends a command to the BMC 314 to cut bulk power to ClientBlade 306, while maintaining standby power to BMC 314.

B. Remote Power State Control via a Decompression Brick System

In the described embodiments, the remote user has full control of the power states of ClientBlade™ 112. The power states of ClientBlade 112 are shutdown, standby, hibernate, restart, and hard power off. To experience the remote desktop session, thin client 138 may enter each of the various power states from an operating system or a remote computer device without an operating system. When the remote user device does not have an operating system, the remote user is provided a decompression brick. The decompression brick provides the video, keyboard, and mouse interface to ClientBlade™ 112. Independent of ClientBlade™ 112 operating system, the remote user logs onto the remote decompression hardware and initiates power state changes independent of the state of ClientBlade™ 112 operating system. In addition, the information technology (IT) administrator retains the ability to place ClientBlade™ 112 in hibernate state via local thin client (210 of FIG. 2, described below) for removal and porting to a different BladeCenter™ 100.

FIG. 2 comprises a diagram of a desktop system linked to a BladeCenter™ system over an area network. Network 200 comprises BladeCenter™ system 206, which is composed of approximately 14 blades (ClientBlade™ 112) that share a pool of local desktops 148. Administrator 216 may manage BladeCenter™ system 206 from local desktop 210. Local desktop 210 comprises a keyboard and mouse, and controls the power states of ClientBlade™ 112 via BladeCenter™ system 206. Local desktop 210 may also consist of a Universal Serial Bus (USB) CD-ROM/DVD (compact disk, read-only memory/digital video disk) drive and USB floppy disk drive. ClientBlade™ 112 may include a Windows XP operating system 209. Each ClientBlade™ 112 in BladeCenter™ system 206 is connected to (at least) one remote desktop 202 through connection broker 204. Connection broker 204 provides the administrative operational interface to computer network 212. Connection broker 204 designates each ClientBlade™ 112 to provide remote access to by the appropriate remote desktop 202, and then connection broker 204 has virtually no connection to remote desktop 210 or ClientBlade™ 112 during the ClientBlade™ session with the remote desktop.

In one embodiment of the invention, the remote user 214 at remote desktop 202 may utilize an operating system, such as with a thin client system, to manage the power states of ClientBlade™ 112. A thin client is a network computer with an operating system but without a hard disk drive, and which only provides video, keyboard, and mouse interface to ClientBlade™ 112. Thin clients allow all data processing to be performed by ClientBlade™ 112 in computer network 212 by remote user 214. Remote user 214 may access total power state control of ClientBlade™ 112 through the thin client operating system. The operating system transmits the power state change instruction to super I/O 308 (FIG. 3), which notifies BMC 314. Super I/O 308 controls the power state hardware and permits power state to change to occur at ClientBlade™ 112.

In an alternative embodiment of the invention, remote desktop 202 of computer network 212 does not require an operating system to manage the power states of the ClientBlade™. Remote desktop 202 may be a decompression brick providing keyboard, mouse, and USB input from the end user and which contains hardware for decompressing video and audio transmitted from the ClientBlade™ 112 to the end user. With this embodiment, all data processing is performed by ClientBlade™ 112, and remote user 214 may access ClientBlade™ 112 through connection broker 204. Remote user 214 logs on to the connection broker, which verifies the identity of the remote user and determines which ClientBlade™ 112 remote user 214 may access. Connection broker 204 transmits the address of the ClientBlade™ 112 that remote user 214 may connect to.

In the alternative embodiment, remote desktop access to management module 318 (FIG. 3) of ClientBlade™ 112 enables remote user 214 to have full control of the power states of ClientBlade™ 112 independent of any operating system. From remote desktop 202, power state instruction is transmitted from management module 318 to BMC 314 (FIG. 3) to BIOS 153 of ClientBlade™ 112, enabling ClientBlade™ 112 to enter additional power states. Therefore, in addition to control of the on/off power states of the ClientBlade™, remote user 214 of a decompression brick may control the sleep and hibernate power states of ClientBlade™ 112.

C. Privilege Access Total Power State Control

In one embodiment, to restrict power state control to particular users, a user password and level of security access may be assigned. To protect power state change at power on of ClientBlade™, the management module transmits a privilege bit mask that is utilized to verify access to the power states by remote user. The privilege bit mask is instruction in which each bit represents an action that may be set for each entry in an access control list, such as user name, password, and security level. The IT administration determines the contents of this access control list. The IT administrator connects to ClientBlade™ through a serial or network connection and establishes communication with the management module of the ClientBlade™ to communicate this information to the ClientBlade™. In one embodiment, the management module transmits a three bit signal to the BMC instructing the ClientBlade™ of the actions that can be invoked by the end user. When requesting a power state change, the end user inputs the power state command followed by the user assigned password. These actions include hard power off, shutdown, sleep, hibernate, or power on as permitted by the administered privilege level of the access control list. Once this action is verified in the ClientBlade™, the appropriate action is taken.

FIG. 4A is an illustration of an administrator interface for assigning security access to a ClientBlade™. Administrator interface 400 provides privileged access to each power state of the ClientBlade™ according to assigned level of security. The administrator enters user name 402, user password 404, and assigns level of security 406 for each user that is permitted to change/access one or more of the power states. In this example embodiment, level of security 406 ranges from zero security level (least privilege) to ten security level (maximum privilege). Assigned user name, password, and level of security are saved to the management module by selecting save option 408, and then the administrator exits the program by selecting exit option 410.

Figure 4:
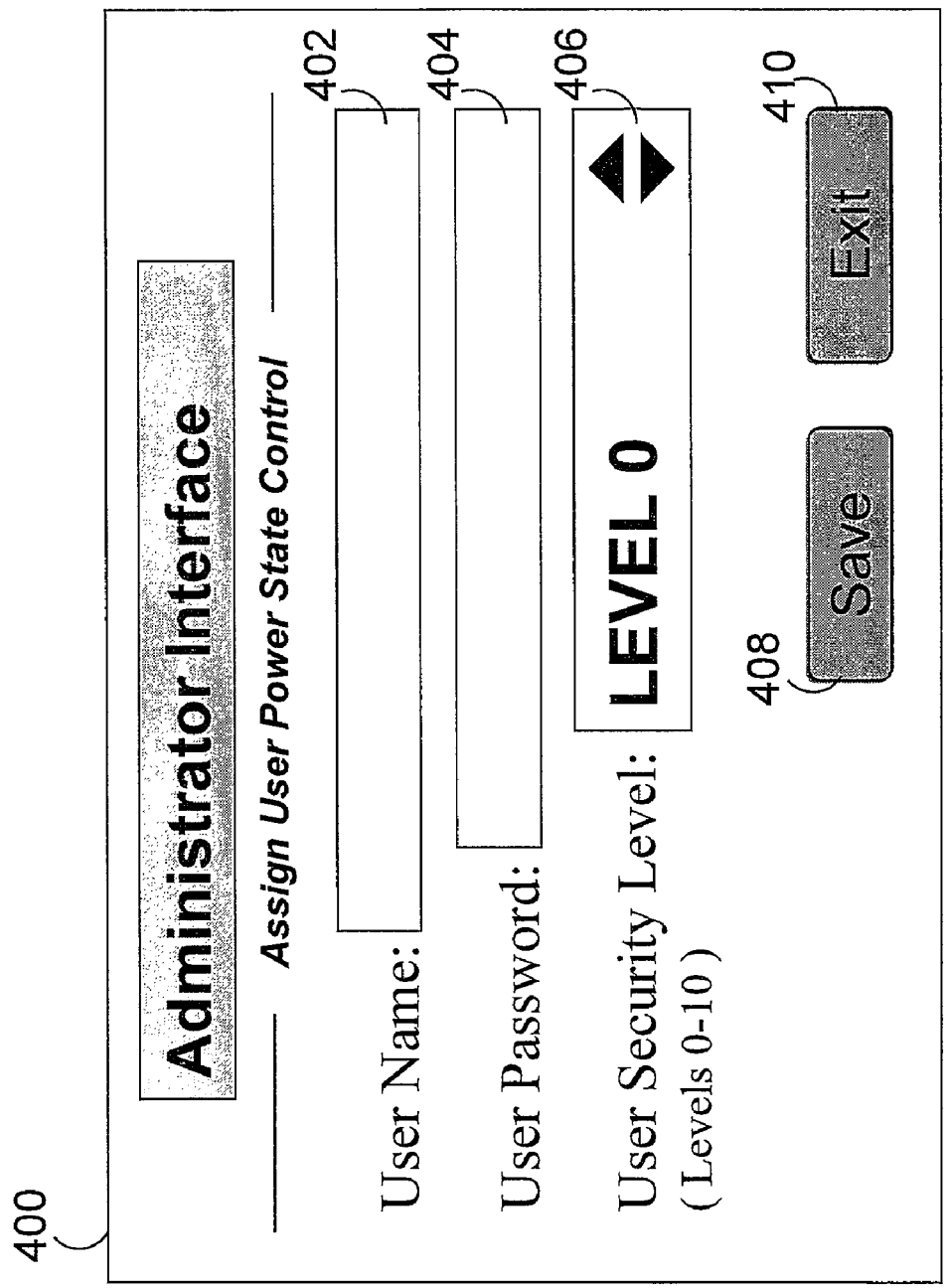
FIG. 4A is an illustrative embodiment of ClientBlade™ administrator graphical user interface.
FIG. 4B is an illustrative embodiment of ClientBlade™ power state control graphical user interface.
Figure 4B:
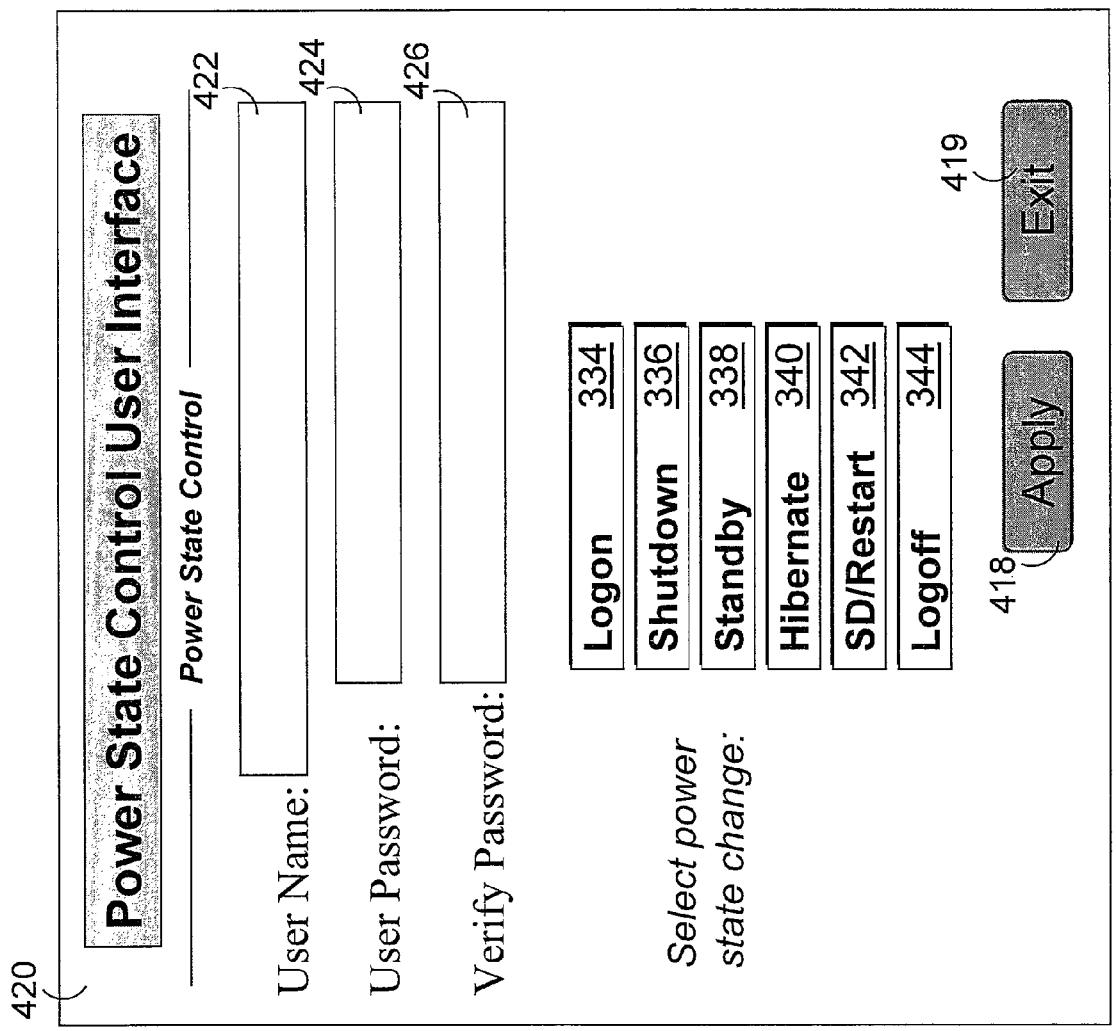

FIG. 4B is an illustration of a user interface to change the power state of a ClientBlade™. User interface 420 allows end user access to ClientBlade™ power state controls, the user must enter user name 422, user password 424, and the user must verify the entered password at dialog box verify password 426. The user then initiates a request to change the power state by selecting "apply" option 418. Alternatively, the user may simply close the user interface 420 by selecting exit option 419 Once the user has been authenticated (i.e., the correct combination of password and user name entered), the end user may activate a change to the power states based on the power state selected within user interface 420. According to the illustrative embodiment, example power states available for selection by the user within user interface 420 includes the following power states: logon 334, shutdown 336, standby 338, hibernate 340, shutdown (SD)/Restart 342, and logoff 344. Additional power states may also be programmed and remotely activated.

Figure 5:
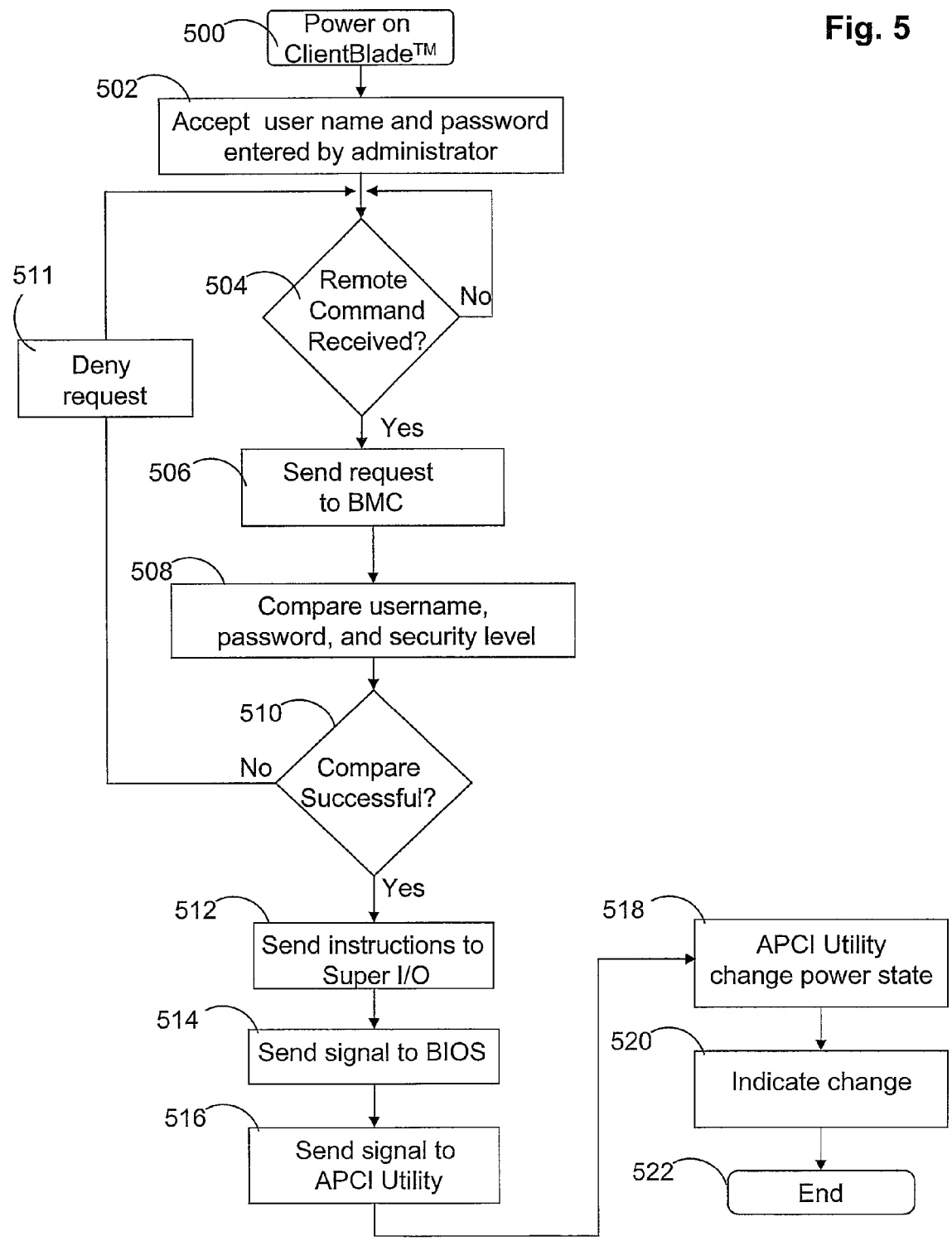
FIG. 5 is a logic flow chart illustrating implementation of end user power state control utilizing a privilege bit mask in accordance with one embodiment of the invention.

The flow chart of FIG. 5 depicts the process of implementing power state control of a ClientBlade™ via a remote desktop with an operating system and an administered security access. The process begins at step 500, at which the Client- Blade™ is powered on by the BladeCenter™ management module (management module 318 of FIG. 3). TPSC utility 140 (FIG. 1) accepts the user name and password entered by the remote user or administrator in step 502. A determination is made at step 504 whether the remote power state command received by the TPSC utility at step 504 is standby or sleep state. If no remote command is received by the TPSC utility at step 504, the TPSC utility waits for a remote power state command. If the remote power state command received is not standby or hibernate, the TPSC utility sends the power state change request to the BMC (314 of FIG. 3), at step 511. If the remote power state command request is standby or hibernate, the BMC compares the user name and password of the remote user to the entries of administered user name, password and security level, as shown at step 508.

If the user name, password, and security level of the remote user successfully compares with the administered user name, password, and security level of the administrator, as determined at step 510, the TPSC utility accepts the power state change request and transmits the request to the BMC at step 511. The TPSC utility then sends the instructions to the Super I/O (308 of FIG. 3) function at step 512. If the user name, password, and security level does not compare successfully at step 510, the TPSC utility denies the request at step 511, and the process returns to step 504 and awaits remote command from a registered remote user. At step 514, the Super I/O transmits the instructions (or signal) to the BIOS (154 of FIG. 1). The BIOS then sends the signal to the advanced configuration and power interface (APCI) utility (304 of FIG. 3) at step 516. The APCI utility provides power management interfaces between the system BIOS and the operating system. At step 518, the APCI utility changes the power state of the ClientBlade™. The TPSC utility then indicates the power state change on the local or remote thin client indicator function, as depicted at step 520. After the power state change has completed (or has been indicated), the process ends at step 522.

Figure 6:
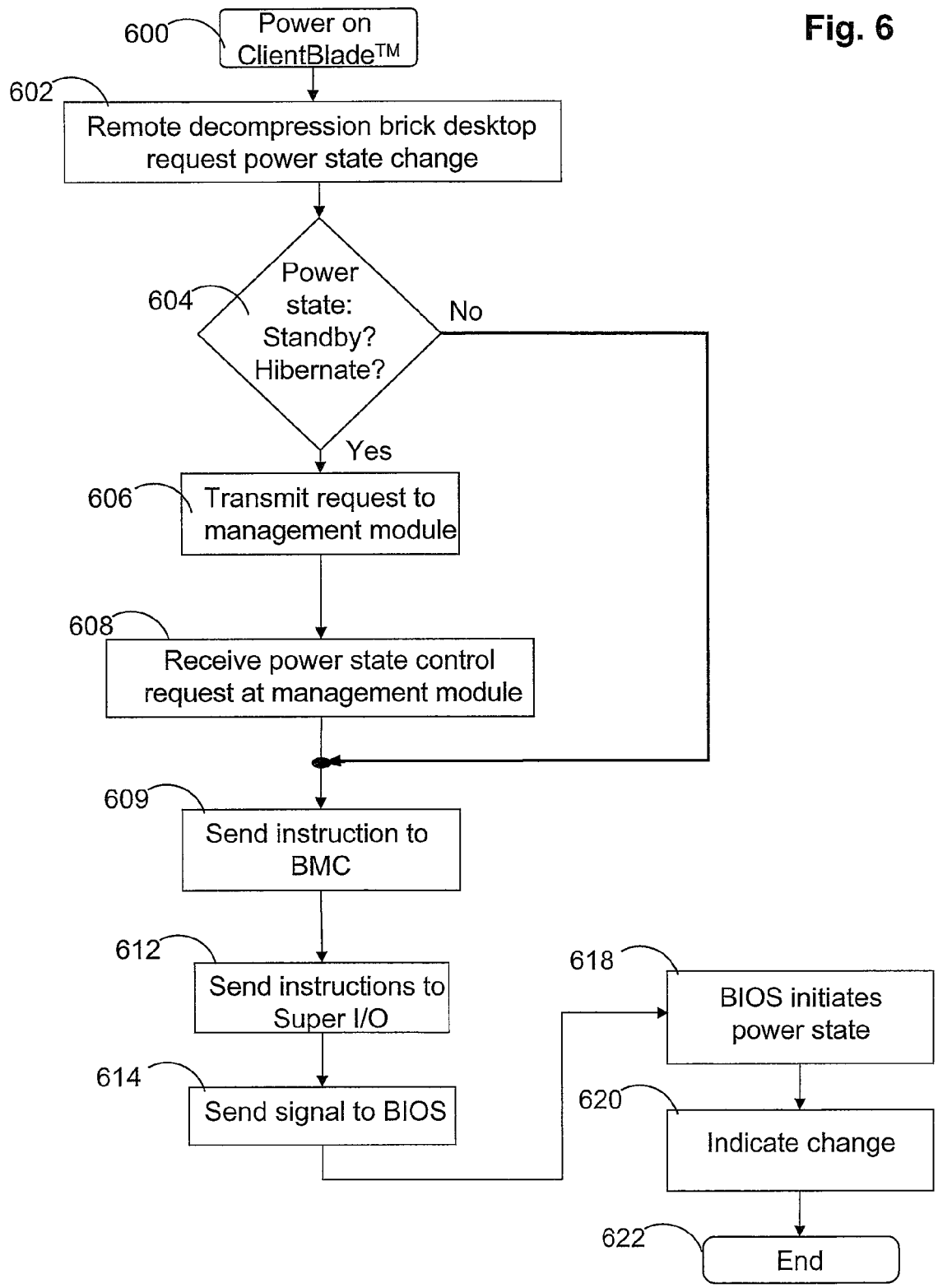
FIG. 6 is a logic flow chart illustrating implementation of end user power state control utilizing a decompression brick system in accordance with one embodiment of the invention.

The flow chart of FIG. 6 depicts the process of implementing power state control of a ClientBlade™ via a decompression brick system. The process begins at step 600, during which the ClientBlade™ is powered on by the BladeCenter™ management module (management module 318 of FIG. 3). Remoter user 214 requests a power state change from a decompression brick desktop system. As in steps 502 through 511 of FIG. 5, described above, the user name and password must be authenticated by the ClientBlade™ or management module. Once the authentication is complete, a determination is made at step 604, whether a remote power state command of standby or hibernate is received by the TPSC utility. If the remote command is not standby or hibernate, the TPSC utility sends the requested command to the BMC (314 of FIG. 3) at step 609. If a remote power state command of standby or hibernate is received, the TPSC utility sends the power state change request to the management module (318 of FIG. 3), at step 606, and the power state request is received at the management module at step 608. The power state change request is then transmitted from the management module to the BMC. The management module provides the Ethernet connection from the BladeCenter to a remote management network, such as computer network 200 of FIG. 2.

Once the power state change request is received at the BMC, the BMC transmits pulsed instructions to the Super I/O (308 of FIG. 3) function at step 612. At step 614, the Super I/O transmits the signal to the BIOS (154 of FIG. 1). The BIOS interprets the pulse widths of the signals and initiates the changes to the power state of the ClientBlade™, at step 618. The TPSC utility indicates the power state change on the local or remote thin client output device, at step 620. After the power state change has been indicated, the process ends at step 622.

Figure 7:
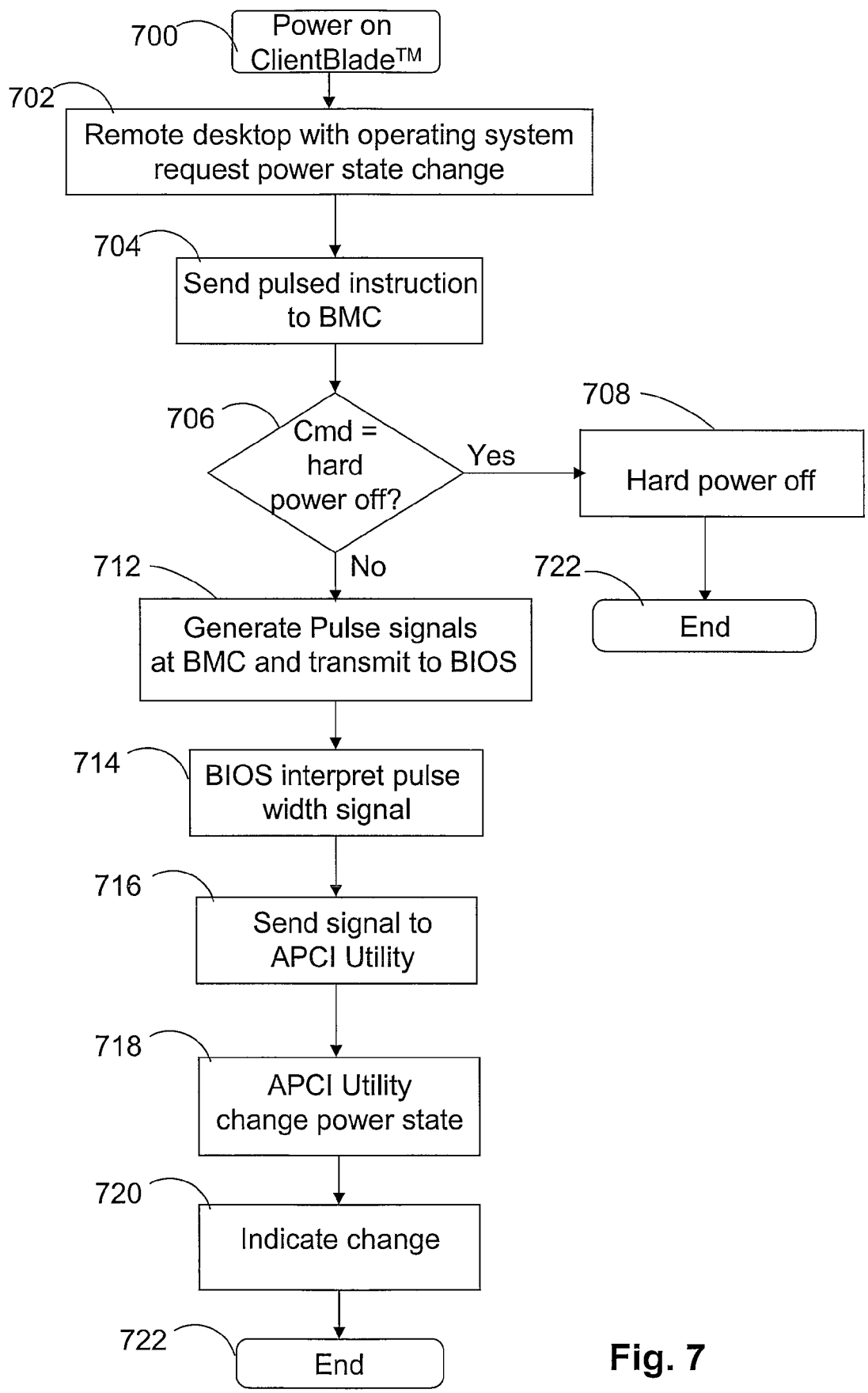
FIG. 7 is a logic flow chart illustrating implementation of end user power state control utilizing a desktop with an operating system in accordance with one embodiment of the invention.

The flow chart of FIG. 7 depicts the process of implementing power state control of a ClientBlade™ via a remote desktop with an operating system. The process begins at step 700, at which the ClientBlade™ is powered on by the Blade-Center™ management module (management module 318 of FIG. 3). At step 702, remote user 214 requests power state changes from a desktop with an operating system. As in steps 502 through 511 of FIG. 5, described above, the user name and password are first authenticated by the ClientBlade or management module. After the authentication is complete, at step 704, the pulsed instructions of the power state change are transmitted to the BMC. A determination is made at step 706 whether the remote power state command is hard power off. If the request is hard power off, then the ClientBlade is hard powered off at step 708. If the request is not hard power off, pulsed signals are generated by the BMC, at step 712. The pulsed signal generated at step 712 is transmitted to the BIOS. The BIOS interprets the pulse widths of the signals at step 714. The BIOS then transmits the power state change command (signal) to the advanced configuration and power interface (APCI) utility (304 of FIG. 3) at step 716. At step 718, the APCI utility changes the power state of the ClientBlade™. The APCI utility provides power management interfaces between the system BIOS and the operating system. The TPSC utility indicates the power state change on the local or remote thin client indicator mechanism at step 720. After the power state change has been indicated, the process ends at step 722.

In the flow charts above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a remote server environment, a method for enabling remote power state control, said method comprising:
   receiving a request from a remote client to change a power state of a server blade;
   determining whether user-authentication parameters received with the request match stored parameters of authenticated remote users with access to change one or more power states of the server blade; and when the user-authentication parameters match the stored parameters, dynamically performing the change requested, whereby secure, remote power state control of the server blade is provided via the remote client, wherein when the remote client includes an operating system, said dynamically performing the change requested comprises:
  forwarding the request to a Baseboard Management Controller (BMC), which generates a pulse having a width corresponding to a particular level of change requested, wherein no pulse is generated when the level of change requested equates to a hard power off of the server blade;
  transmitting the pulse to a basic input/output system (BIOS), which determines a specific level of change to implement based on the width of the pulse; and
  activating the specific level of an Advanced Configuration and Power Interface (ACPI) to change the power state based on an input from the BIOS.

2. The method of claim 1, wherein said determining further comprises:
  parsing the request for data indicating a level of change to power state control being requested;
  when the level of change requested does not require user authentication, immediately forwarding the request to a controller, which activates completion of the change requested;
  when the level of change requested requires user authentication:
    comparing the level of change to power state being requested with a pre-established level of change authorized for particular user-authentication parameters;
    when the level of change to power state is at or below the pre-established level, triggering the dynamically performing of the change requested; and
    when the level of change to power state is above the pre-established level, preventing the change requested from being completed.

3. The method of claim 2, further comprising:
  when the dynamically performing of the change requested is completed, forwarding a completion signal to the remote client indicating completion of the change to the power state; and
  when the change requested is prevented from completing, forwarding a signal indicating that access to perform the change requested is denied.

4. The method of claim 1, further comprising:
  enabling administrative access to the server blade to set up privilege accesses to remotely change the power state for one or more remote users; and
  storing data corresponding to the privilege accesses enabled in a secure storage associated with the server blade, said data identifying an administered user name, password and associated security level.

5. The method of claim 2, wherein when the remote client is connected to the server blade via a serial over LAN connection, said method further comprises completing a hard power off operation without notifying the BIOS of the server blade.

6. The method of claim 1, wherein the change requested to the power state comprises one of: standby, hibernate, and sleep states.

7. In a remote server environment, a method for enabling remote power state control, said method comprising:
  receiving a request from a remote client to change a power state of a server blade;
  determining whether user-authentication parameters received with the request match stored parameters of authenticated remote users with access to change one or more power states of the server blade; and
  when the user-authentication parameters match the stored parameters, dynamically performing the change requested, whereby secure, remote power state control of the server blade is provided via the remote client, wherein when the remote client is a decompression brick, which does not include an operating system, said dynamically performing the change requested comprises:
    forwarding the request to a management module associated with the server blade;
    performing functions to alert an operating system of the server blade of the receipt of the request;
    forwarding the request to a baseboard management controller (BMC) to activate the change to the power state, wherein the BMC generates a pulse having a width corresponding to a particular level of change requested, wherein no pulse is generated when the level of change requested equates to a hard power off of the server blade;
    transmitting the pulse to a basic input/output system (BIOS), which determines a specific level of change to implement based on the width of the pulse; and
    activating the specific level of change requested by triggering an advanced configuration and power interface (ACPI) to change the power state based on an input from the BIOS.

8. In a remote server environment, a method for enabling remote power state control, said method comprising:
  receiving a request from a remote client to change a power state of a server blade;
  determining whether user-authentication parameters received with the request match stored parameters of authenticated remote users with access to change one or more power states of the server blade; and
  when the user-authentication parameters match the stored parameters, dynamically performing the change requested, whereby secure, remote power state control of the server blade is provided via the remote client;
  wherein the server blade is a server blade device and is connected to a blade center chassis having the management module, which receives instructions to change the power state of the server blade device from a user interface of a remote desktop, said method further comprising:
    receiving a Transmission Control Protocol/Internet Protocol (TCP/IP) message, via a network connected to the server blade device via the management module, wherein said TCP/IP message includes the request to initiate power state change; and
    on receipt of the TCP/IP messages, sending an interrupt to a baseboard management controller (BMC), which receives the request for a change to the power state and initiates an action from among:
      when a hard power off is requested, triggering an advanced configuration and power interface (ACPI) to complete the hard power off without communicating with the basic input/output system (BIOS); and
      when a different power state is requested, providing a power on/off pulse of a specific length corresponding to the different power state requested;

activating the different power state via the BIOS of the server blade device, wherein the BIOS triggers ACPI to place the server blade device in the different power state.

9. A computer program product comprising a tangible computer readable medium storing program code that when executed within a blade-server system provides the functionality of claim 1.

10. A blade server chassis system comprising:
a chassis having a management module, which controls general connectivity and functions of the blade server chassis system and enables connection of the blade server chassis system to a remote client via an external network;
a server blade device coupled to the chassis of the blade server chassis system, said server blade device comprising a Baseboard Management Controller (BMC), a Basic Input/Output System (BIOS), and an Advanced Configuration and Power Interface (ACPI) for controlling power states of the server blade device;
wherein the management module receives and, along with the BMC, BIOS and APCI, processes specific ones of a change requested by the remote client to a power state of the server blade device when the remote client is authenticated to perform the change requested, wherein the remote client is enabled to perform the change requested whether or not the remote client device includes an operating system;
means for receiving a request from the remote client to change a power state of the server blade device;
means for determining whether user-authentication parameters received with the request match stored parameters of authenticated remote users with access to change one or more power states of the server blade device;
when the user-authentication parameters match the stored parameters, means for dynamically performing the change requested, whereby secure, remote power state control of the server blade device is provided via the remote client; and
wherein when the remote client includes an operating system, said means for dynamically performing the change requested comprises:
  means for forwarding the request to the BMC, which generates a pulse having a width corresponding to a particular level of change requested, wherein no pulse is generated when the level of change requested equates to a hard power off of the server blade device;
  means for transmitting the pulse to the BIOS, which determines a specific level of change to implement based on the width of the pulse; and
  means for activating the specific level of change requested by triggering the ACPI to change the power state based on an input from the BIOS.

11. The system of claim 10, wherein said means for determining further comprises:
  means for parsing the request for data indicating a level of change to power state control being requested;
  when the level of change requested does not require user authentication, means for immediately forwarding the request to a controller, which activates completion of the change requested; and
  when the level of change requested requires user authentication:
    means for comparing the level of change to power state being requested with a pre-established level of change authorized for the particular user-authentication parameters;
    when the level of change to power state is at or below the pre-established level, means for triggering the dynamically performing of the change requested; and
    when the level of change to power state is above the pre-established level, means for preventing the change requested from being completed.

12. The system of claim 11, further comprising:
when the dynamically performing of the change requested is completed, means for forwarding a completion signal to the remote client indicating completion of the change to the power state; and
when the change requested is prevented from completing, means for forwarding a signal indicating that access to perform the change requested is denied.

13. The system of claim 10, further comprising:
means for enabling administrative access to the server blade device to set up privilege accesses to remotely change the power state for one or more remote users; and
means for storing data corresponding to the privilege accesses enabled in a secure storage associated with the server blade device, said data identifying an administered user name, password and associated security level.

14. The system of claim 11, wherein when the remote client is connected to the server blade device via a serial over LAN connection, said system further comprises means for completing a hard power off operation without notifying the BIOS of the server blade device.

15. The system of claim 10, wherein the change requested to the power state comprises one of: standby, hibernate, and sleep states.

16. A blade server chassis system comprising:
a chassis having a management module, which controls general connectivity and functions of the blade server chassis system and enables connection of the blade server chassis system to a remote client via an external network;
a server blade device coupled to the chassis of the blade server chassis system, said server blade device comprising a Baseboard Management Controller (BMC), a Basic Input/Output System (BIOS), and an Advanced Configuration and Power Interface (ACPI) for controlling power states of the server blade device;
wherein the management module receives and, along with the BMC, BIOS and APCI, processes specific ones of a change requested by the remote client to a power state of the server blade device when the remote client device is authenticated to perform the change requested, wherein the remote client is enabled to perform the change requested whether or not the remote client includes an operating system;
means for receiving a request from the remote client to change a power state of the server blade device;
means for determining whether user-authentication parameters received with the request match stored parameters of authenticated remote users with access to change one or more power states of the server blade device; and
when the user-authentication parameters match the stored parameters, means for dynamically performing the change requested, whereby secure, remote power state control of the server blade device is provided via the remote client, wherein when the remote client is a decompression brick, which does not include an operating system, said mean for dynamically performing the change requested comprises:
means for forwarding the request to a management module associated with the server blade device;

means for performing functions to alert an operating system of the server blade device of the receipt of the request;

means for forwarding the request to the BMC to activate the change to the power state, wherein the BMC generates a pulse having a width corresponding to a particular level of change requested, wherein no pulse is generated when the level of change requested equates to a hard power off of the server blade device;

means for transmitting the pulse to the BIOS, which determines a specific level of change to implement based on the width of the pulse; and means for activating the specific level of change requested by triggering the ACPI to change the power state based on an input from the BIOS, 17. A blade server chassis system comprising:

a chassis having a management module, which controls general connectivity and functions of the blade server chassis system and enables connection of the blade server chassis system to a remote client via an external network;

a server blade device coupled to the chassis of the blade server chassis system, said server blade device comprising a Baseboard Management Controller (BMC), a Basic Input/Output System (BIOS), and an Advanced Configuration and Power Interface (ACM) for controlling power states of the server blade device;

wherein the management module receives and, along with the BMC, BIOS and APCI, processes specific ones of a change requested by the remote client to a power state of the server blade device when the remote client device is authenticated to perform the change requested, wherein the remote client is enabled to perform the change requested whether or not the remote client device includes an operating system;

means for receiving a request from the remote client to change a power state of the server blade device;

means for determining whether user-authentication parameters received with the request match stored parameters of authenticated remote users with access to change one or more power states of the server blade device;

when the user-authentication parameters match the stored parameters, means for dynamically performing the change requested, whereby secure, remote power state control of the server blade device is provided via the remote client;

means for receiving a Transmission Control Protocol/Internet Protocol (TCP/IP) message, via a network connected to the server blade device via the management module, wherein said TCP/IP message includes the request to initiate power state change; and on receipt of the TCP/IP messages, means for sending an interrupt to BMC, which receives the request for a change to the power state and includes:

when a hard power off is requested, means for triggering the ACPI to complete the hard power off without communicating with the BIOS; and when a different power state is requested, means for providing a power on/off pulse of a specific length corresponding to the different power state requested;

means for activating the different power state via the BIOS of the server blade device, wherein the BIOS triggers ACPI to place the server blade device in the different power state.

* * * * *